United States Patent [19]

Dittner et al.

[11] Patent Number: 4,571,010
[45] Date of Patent: Feb. 18, 1986

[54] ANTI-SLIPPING SYSTEM

[75] Inventors: Adam Dittner, Höchstadt; Joachim Sauer, Erlangen, both of Fed. Rep. of Germany

[73] Assignee: FAG Kugelfischer Georg Schafer, Kommanditgesellschaft auf Aktien, Fed. Rep. of Germany

[21] Appl. No.: 534,196

[22] Filed: Sep. 21, 1983

[30] Foreign Application Priority Data

Oct. 1, 1982 [DE] Fed. Rep. of Germany ....... 3236366

[51] Int. Cl.³ .............................................. B60T 8/02
[52] U.S. Cl. .................................................. 303/110
[58] Field of Search ............... 188/181 C; 303/95, 97, 303/99, 103, 105, 110, 119; 364/426

[56] References Cited

U.S. PATENT DOCUMENTS

| | | |
|---|---|---|
| 3,025,722 | 3/1962 | Eger, Jr. et al. |
| 3,288,232 | 11/1966 | Shepherd ........................ 303/119 X |
| 3,574,417 | 4/1971 | Howard et al. ................. 303/119 X |
| 3,582,152 | 6/1971 | Burckhardt et al. ........... 303/110 X |
| 3,773,364 | 11/1973 | Michellone et al. ................ 303/110 |
| 3,897,114 | 7/1975 | Scharlack ............................ 303/110 |
| 4,274,680 | 6/1981 | Sieving et al. ...................... 303/6 A |
| 4,349,233 | 9/1982 | Bullard et al. ........................ 303/96 |

FOREIGN PATENT DOCUMENTS 2756192 6/1978 Fed. Rep. of Germany.
3117105 11/1982 Fed. Rep. of Germany.
1544467 4/1979 United Kingdom.

*Primary Examiner*—Duane A. Reger
*Attorney, Agent, or Firm*—Ostrolenk, Faber, Gerb & Soffen

[57] ABSTRACT

An anti-slipping system for preventing slippage between vehicle wheels driven by a differential is disclosed. The system includes first and second speed sensors for generating speed signals indicative of the rotational speed of first and second wheels of a vehicle, respectively, first and second braking control modules for adjusting the braking force applied to the first and second wheels as a function of first and second brake control signals, respectively, and a signal generating circuit for generating the first and second brake control signals as a function of the first and second speed signals.

11 Claims, 1 Drawing Figure

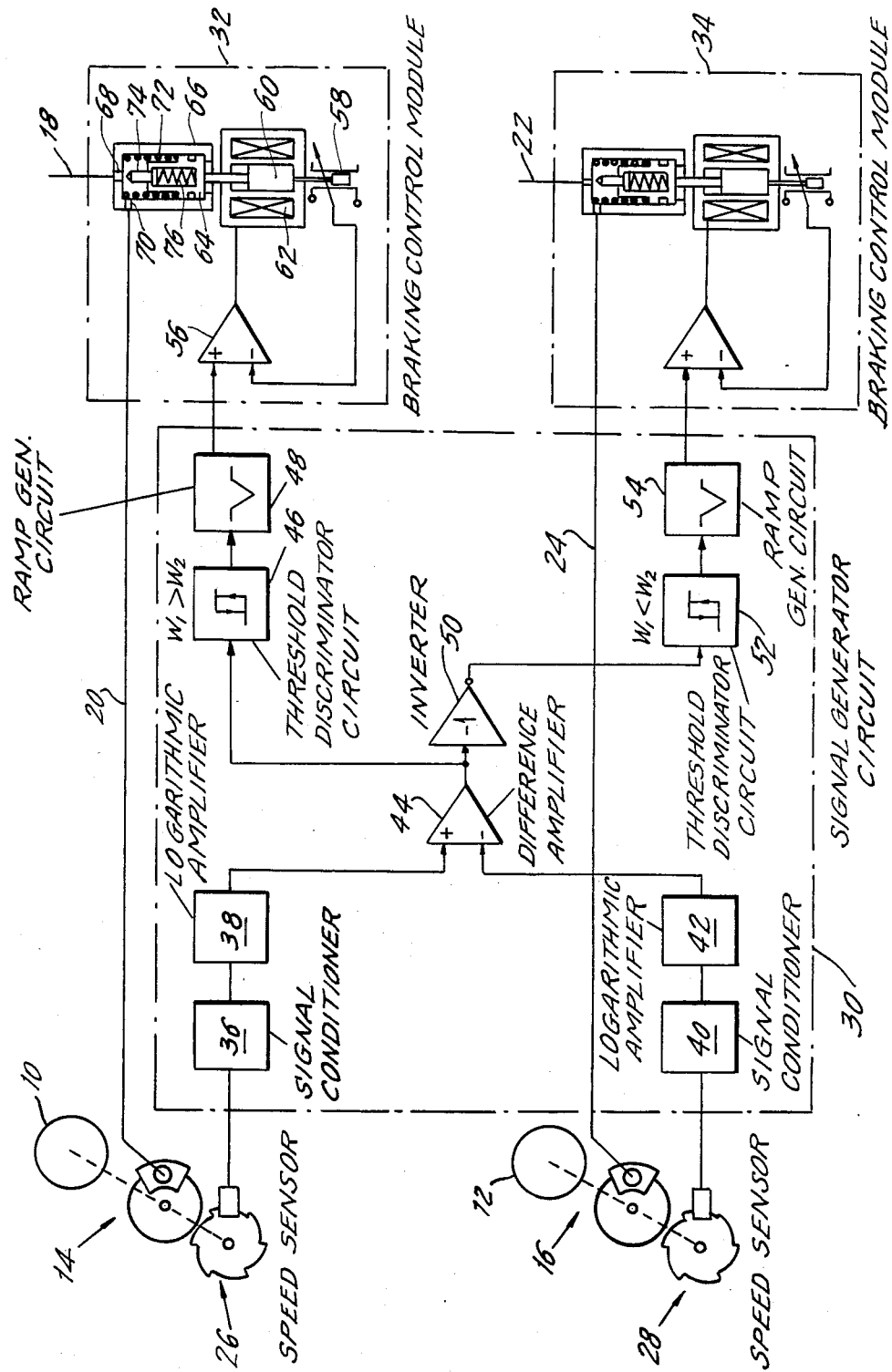

ANTI-SLIPPING SYSTEM

BACKGROUND OF THE INVENTION

The present invention is directed towards a system for preventing slippage between vehicle wheels driven by a differential. More particularly, the present invention is directed towards such a system which can easily be installed and retrofitted as special equipment in existing standard vehicles.

Under normal conditions, opposite wheels of the vehicle will rotate at substantially the same speed although small variations will occur when the vehicle is rounding a curve. When one of the wheels loses traction with the road (e.g., because the surface is slippery or because the wheel temporarily leaves the ground), the speed of rotation of that wheel will increase since the drive to the wheel is constant but the resistance to the rotation of the wheel is reduced. The slippage of the wheel is undesirable both because it reduces traction between the vehicle and the road, which is dangerous, and because it reduces the amount of propulsion available to move the vehicle.

In the past, mechanical differential locks have been used to prevent slippage between opposite wheels. While these devices have generally been effective in preventing such slippage, they are mechanically complex and must be installed with the original equipment in the vehicle.

BRIEF DESCRIPTION OF THE INVENTION

The primary object of the present invention is to provide a non-mechanically operated anti-slipping system which can easily be installed and retrofitted as special equipment in an existing standard vehicle. This object is obtained by providing an anti-slipping system comprising:

first and second speed sensors for generating speed signals indicative of the rotational speed of first and second wheels of a vehicle, respectively;

first and second braking control modules for adjusting the braking force applied to the first and second wheels as a function of first and second brake control signals, respectively; and a signal generating circuit for generating the first and second brake control signals as a function of the first and second speed signals.

BRIEF DESCRIPTION OF THE DRAWING

The sole FIGURE is a schematic diagram of an anti-slipping system constructed in accordance with the presently preferred embodiment of the invention.

DETAILED DESCRIPTION OF THE PREFERRED EMBODIMENT

A pair of wheels 10, 12 are driven via a differential and are connected to associated disk brakes 14, 16, respectively. The operation of the brakes 14, 16 is controlled by a standard hydraulic braking system which supplies a fluid pressure to the brakes 14, 16 via lines 18, 20 and 22, 24 in a known manner. These elements are standard on most vehicles and do not form a part of the present invention.

The anti-slipping system of the present invention includes a pair of speed sensors 26, 28, a signal generating circuit 30 and first and second braking control circuits 32, 34. The speed sensors 26, 28 may take any known form and generate output signals (speed signals) indicative of the speed of rotation of their respective wheels 10, 12. In the embodiment shown, the speed sensors 26, 28 are schematically illustrated as including a rotating member connected to the axle on which the wheel is connected and a signal generator for generating an output signal indicative of the speed of rotation of the rotating member. For example, the rotating member can include a scalloped perimeter as shown and the signal generator can generate output signals as a function of the distance between the signal generator and the periphery of the rotating member at any given instant. This will effectively produce a pulse train at the output of the signal generator whose frequency is proportioned to the speed of rotation of the rotary member and, therefore, the associated wheel.

The speed signals generated by the speed sensors 26, 28 are applied to respective inputs of signal generating circuit 30 which compares the signals to determine both the difference in magnitude between the speed of rotation of the two wheels 10, 12 and to determine which of the two wheels is rotating faster. Signal generating circuit 30 generates output signals (first and second braking signals) which are applied to first and second braking control modules 32, 34 and control the braking action of the disk brakes 14, 16, respectively.

When the wheel 10 rotates faster than the wheel 12, signal generating circuit 30 generates a first brake control signal which is applied to the first breaking control module 32. Braking control module 32 responds to this signal by increasing the hydraulic pressure in line 20 (although not in line 18) so as to increase the braking action of the disk brake 14. As will be described in greater detail below, the increase in braking pressure is performed gradually in accordance with a predetermined gradient until the speed of rotation of the wheel 10 drops to within a predetermined differential (percentage differential) of the speed of rotation of the wheel 12. Once the speed of rotation of the wheel 10 has reduced to the desired level, the signal generating circuit 30 reduces the first brake control signal so as to decrease the hydraulic pressure in line 20 and thereby reduce the braking force being applied by disk brake 14. The braking pressure is also reduced gradually so as to avoid oscillation in the system. In this manner, the speed of rotation of the wheel 10 will be brought within a desired percentage of the speed of rotation of the wheel 12.

When the speed of rotation of the wheel 12 increases above that of the wheel 10, the signal generating circuit 30 generates a second brake control signal which is applied to the second braking control module 34. Second braking control module 34 then reduces the speed of rotation of the wheel 12 in a similar manner to that of module 32.

The speed signal generated by speed sensor 26 is applied to signal conditioner 36 which conditions the signal and applies it to a logarithmic amplifier 38. Similarly, the output of speed sensor 28 is applied to a signal conditioner 40 and then a logarithmic amplifier 42. The outputs of logarithmic amplifiers 38, 40 are applied to opposite inputs of a difference amplifier 44 which generates an output signal whose magnitude is indicative of a percentage differential between the speed of rotation of wheels 10, 12 and whose sign is indicative of which of the two wheels is spinning faster. This signal will be positive whenever the wheel 10 is spinning faster than the wheel 12 and will be negative whenever the wheel 12 is spinning faster than the wheel 10.

The output of difference amplifier 44 is applied to a threshold discriminator circuit 46 which compares the output of difference amplifier 44 to a predetermined value representative of the maximum permissible slippage differential (in percent) between the wheels 10, 12 under normal operating conditions (i.e., when the vehicle is rounding a tight curve). Whenever the magnitude of the output of difference amplifier 44 is greater than its predetermined value, threshold discriminator circuit 46 applies an output signal to ramp generator circuit 48. As long as the value of the output of difference amplifier 44 remains below the predetermined level, discriminator circuit 46 will not apply an output signal to ramp generator circuit 48.

Ramp generator circuit 48 generates a gradually increasing output signal (the first brake control signal) which increases in accordance with a predetermined gradient in response to the signal appearing at the output of threshold discriminator circuit 46. As will be explained in greater detail below, this signal causes the brake pressure in line 20 to increase in accordance with said gradient so as to gradually increase the brake pressure applied by disk brake 14. This will cause the speed of rotation of wheel 10 to decrease until the output of difference amplifier 44 falls below the threshold level of threshold discriminator circuit 46. At this point, the first brake control signal generated by ramp generator circuit 48 will decrease in value by the same gradient so as to gradually reduce the braking pressure applied to wheel 10 by disk brake 14. This is highly desirable since it avoids oscillations of the operation of the brake 14.

When the speed of rotation of wheel 12 is greater than that of wheel 10, the output difference amplifier 44 will be negative. This signal is inverted by inverter 50 and then applied to threshold discriminator circuit 52. Like discriminator circuit 46, threshold discriminator 52 generates an output whenever the magnitude of the signal appearing at its input is greater than a predetermined value representative of the maximum permissible slippage differential between wheels 10, 12 under normal operating conditions. This signal is applied to ramp generator circuit 54 which operates in the same manner as ramp generator 48. As a result, braking control circuit 34 first increases the brake pressure applied by disk brake 16 in a linear manner until the speed of rotation of wheel 12 falls within the predetermined percentage differential of the speed of rotation of wheel 10 at which time the output of ramp generator circuit 54 decreases in accordance with the predetermined gradient so as to prevent any oscillations in the system.

Braking control module 32 includes a difference amplifier 56 which compares the first braking control signal to the signal generated by position detector 58. Position detector 58 may be formed of any known circuit and generates an output signal indicative of the position of the armature 60 relative to the windings 62. The output of difference amplifier 56 is applied to the windings 62 so as to define a feedback circuit which causes the position of the armature 60 to reach a level determined by the magnitude of the first brake control signal.

Armature 60 is connected to the compressor piston 64 of a pressure chamber 66. The pressure chamber 66 interconnects the fluid lines 18, 20 via openings 68, 70, respectively. Under normal conditions, the compressor piston 64 is biased into its lowermost position (the position shown in the Figure) by a spring 72. In this position, the pressure chamber 66 has no substantial effect on the operation of the hydraulic braking system.

If the speed of rotation of wheel 10 increases above the speed of rotation of the wheel 12 by the predetermined percentage value, ramp generator circuit 48 will begin generating a ramping output signal which causes the compressor piston 64 to gradually rise within the pressure chamber 66. Once the position of piston 64 has been raised slightly, the valve closure member 74 closes off the opening 68 and permits the pressure in the pressure chamber 66 to increase as the piston 64 rises. This increased pressure is transmitted to the disk brake 14 via the fluid line 20 so as to decrease the rotation of wheel 10. This pressure continues to increase until the speed of wheel 10 falls within the predetermined percentage of the speed of wheel 12. At that time, ramp generator circuit 48 will reduce the level of the first brake control signal in accordance with the predetermined gradient until the piston 64 is returned to its lower level.

In order to ensure that the braking control module 32 does not interfere with the normal operation of the hydraulic braking system of the vehicle, the valve closure member 74 is spring-biased within the piston 64 by a spring 76. If the braking control module 32 is in operation and the piston 64 has been raised by a sufficient degree to cause the valve closure member 74 to close the opening 68, any increase in the pressure in line 18 which is generated by the vehicle braking system will overcome the force of spring 76 and cause the additional braking pressure to be transmitted through pressure chamber 66 to line 20 and then to disk brake 14.

The structure and operation of braking control module 34 is idential to that of braking control module 32 and will not be described further herein.

As should be apparent from the foregoing, the anti-slipping system of the present invention is simple and inexpensive in construction and can easily be retrofitted as special equipment in a standard vehicle. While the present invention is particularly useful when retrofitted to a standard vehicle, it can, if desired, be applied as original equipment to the vehicle.

The present invention may be embodied in other specific forms without departing from the spirit or essential attributes thereof and, accordingly, reference should be made to the appended claims, rather than to the foregoing specification as indicating the scope of the invention.

What is claimed is:

1. An anti-slipping system for use in a vehicle for preventing slippage between wheels of said vehicle which are equipped with hydraulic brakes, said system comprising:

first and second speed sensors for generating speed signals indicative of the rotational speed of first and second said wheels of said vehicle, respectively;

first and second braking control modules for adjusting the braking force applied to said first and second wheels as a function of first and second brake control signals, respectively; each braking control module being connected between a respective first fluid line connected to a source of fluid pressure and a respective second fluid line connected to a respective hydraulic brake on said respective first or second wheel; each braking control module comprising respective pressure means for receiving fluid through said respective first fluid line and selectively operable for gradually increasing and decreasing the fluid pressure applied to the respective hydraulic brake through said respective second fluid line for adjusting said braking force;

each said respective pressure means always applying a fluid pressure to the respective said second line which is at least equal to the fluid pressure in its respective said first line; each said respective pressure means of said first and second braking control modules comprising:
- (A) a housing having a first opening connected to its respective said first line and a second opening connected to its respective said second line, said openings communicating with a fluid pressure chamber of said housing;
- (B) a piston situated in said housing and movable between a normal and a pressure applying position such that the volume of said pressure chamber is varied as a function of the position of said piston within said housing; and
- (C) a valve closure member coupled to said piston and being movable between an open and a closed position with respect to said piston, said valve closure member being spring biased into its said closed position, said valve closure member being so positioned with respect to said piston and said housing that said valve closure member is removed from said first opening when said piston is in said normal position and is in contact with and closes said first opening once said piston has been moved part way from said normal position to said pressure applying position;

said first and second braking control modules each further comprising means responsive to the said respective brake control signal applied to the respective braking control module for adjusting the position of said piston in said housing; each said piston position adjusting means comprising:
- (i) a detector for generating a position signal indicating the position of said piston
- (ii) a difference circuit for receiving said position signal and said respective brake control signal and for generating a difference signal; and
- (iii) a winding responsive to said difference signal for causing the position of said piston to change in accordance with said respective brake control signal; and a signal generating circuit for generating said first and second brake control signals as a function of said first and second speed signals.

2. The anti-slipping system of claim 1, wherein said first and second brake control signals are generated as a function of the difference between said first and second speed signals.

3. The anti-slipping device of claim 2, wherein said first and second brake control signals are generated as a function of the percentage differential between said first and second speed signals.

4. The anti-slipping system of claim 3, wherein:
- (A) said first brake control signal causes said first braking control module to increase the braking force on said first wheel whenever the speed of rotation of said first wheel is greater than the speed of rotation of said second wheel by at least a predetermined percentage; and
- (B) said second brake control signal causes said second breaking control module to increase the braking force on said second wheel whenever the speed of rotation of said second wheel is greater than the speed of rotation of said first wheel by at least a predetermined percentage.

5. The anti-slipping device of claim 4, wherein said first and second braking modules:
respond to said first and second brake control signals, respectively, by increasing the braking pressure applied to said first and second wheels, respectively, in a gradual manner; and
decrease the braking pressure applied to said first and second wheels in a gradual manner once the speed of said first and second wheels, respectively, falls within said percentage differential of the other said wheel.

6. The anti-slipping device of claim 5, wherein said signal generating circuit comprises:
first means responsive to said speed signals for generating a difference signal indicative of the difference between the speed of said first and second wheels;
second means responsive to said difference signal for generating said first brake control signal; and
third means responsive to said difference signal for generating said second brake control signal.

7. The anti-slipping device of claim 6, wherein said second and third means include respective ramp generators.

8. The anti-slipping system of claim 1, wherein said signal generating circuit comprises means for causing each of said first and second brake control signals to increase according to a first predetermined gradient and to decrease according to a second predetermined gradient.

9. The anti-slipping system of claim 8, wherein said means for causing comprises first and second ramp generators for generating said first and second brake control signals, respectively.

10. The anti-slipping system of claim 8, wherein each of said first and second braking control modules further comprises means responsive to said first and second brake control signals, respectively, for selectively operating said respective pressure means to gradually increase the applied fluid pressure when said respective brake control signal is increasing and to gradually decrease the applied fluid pressure when said respective brake control signal is decreasing.

11. An anti-slipping system for use in a vehicle for preventing slippage between wheels of said vehicle which are equipped with hydraulic brakes, said system comprising:
- (1) a difference signal generating circuit for determining the difference between the rates of rotation of a first wheel and a second wheel of said vehicle and for generating at least one difference signal indicating said difference between the rates of rotation;
- (2) first and second control means for receiving said difference signal, each for controlling a hydraulic brake on a respective one of said first and second wheels and each comprising:
  - (A) a housing defining a pressure chamber having a first opening for entering fluid into said pressure chamber from a source of fluid pressure and a second opening for exiting fluid from said pressure chamber to said hydraulic brake on said respective first or second wheel;
  - (B) a piston situated in said housing and movable between a normal position and a pressure applying position for varying the volume of said pressure chamber as a function of the position of said piston within said housing;

(C) a valve closure member mounted to said piston and movable therewith between said normal and pressure applying positions for closing said first opening when said piston moves from said normal position to said pressure applying position, the movement of said piston thereby varying the fluid pressure through said second opening, said valve closure member further being further movable in relation to said piston between an open position and a closed position;

(D) bias means for exerting a force for holding said valve closure member in said closed position when said valve closure member is closing said first opening in said pressure applying position, said force being overcome by pressure from said source of fluid pressure for permitting said valve closure member to move to said open position for opening said first opening during normal braking; and (E) a control circuit for controlling the position of said piston comprising:
  (i) an armature coupled to said piston for driving said piston between said normal and pressure applying positions;
  (ii) a solenoid coil around said armature for controlling the position of said armature in response to a control signal;
  (iii) a detecting circuit for detecting the position of said armature and generating an armature position signal; and
  (iv) a comparison circuit for receiving said armature position signal and said difference signal and for generating said control signal for causing said armature to move to a position corresponding to said difference signal for causing said piston to vary the fluid pressure through said second opening; said first and second control means causing said first and second wheels to rotate at approximately the same rate.

* * * * *